US008589257B2

(12) United States Patent
Kirby et al.

(10) Patent No.: US 8,589,257 B2
(45) Date of Patent: Nov. 19, 2013

(54) METHOD, SYSTEM AND APPARATUS FOR MANAGING INVENTORY

(75) Inventors: Sean Kirby, Toronto (CA); Jason Yuen, Toronto (CA); Kevin Wong, Toronto (CA); Ian Bailey, Toronto (CA)

(73) Assignee: Nulogy Corporation, Toronto (CA)

( * ) Notice: Subject to any disclaimer, the term of this patent is extended or adjusted under 35 U.S.C. 154(b) by 0 days.

(21) Appl. No.: 12/983,060

(22) Filed: Dec. 31, 2010

(65) Prior Publication Data

US 2012/0173392 A1 Jul. 5, 2012

(51) Int. Cl.
*G06Q 10/00* (2012.01)

(52) U.S. Cl.
USPC ............. 705/28; 717/121; 717/124; 235/385; 235/454; 705/15; 705/22; 705/24; 705/30; 705/29; 705/32; 705/37

(58) Field of Classification Search
USPC .......................................................... 705/28
See application file for complete search history.

(56) References Cited

U.S. PATENT DOCUMENTS

| 5,946,662 | A | 8/1999 | Ettl et al. | |
|---|---|---|---|---|
| 7,072,857 | B1 | 7/2006 | Calonge | |
| 2002/0059108 | A1 | 5/2002 | Okura et al. | |
| 2003/0014142 | A1* | 1/2003 | Olle et al. | 700/110 |
| 2003/0074284 | A1 | 4/2003 | Bowden | |
| 2003/0195824 | A1 | 10/2003 | Duffy et al. | |
| 2006/0149658 | A1 | 7/2006 | Smith | |
| 2006/0229899 | A1* | 10/2006 | Hyder et al. | 705/1 |
| 2007/0124231 | A1 | 5/2007 | Ristock et al. | |
| 2008/0269942 | A1 | 10/2008 | Free | |
| 2009/0094040 | A1 | 4/2009 | Lewis | |
| 2010/0146047 | A1 | 6/2010 | Grieder et al. | |
| 2011/0251865 | A1* | 10/2011 | Yuen et al. | 705/7.11 |

FOREIGN PATENT DOCUMENTS

| CA | 2251075 A1 | 8/1997 |
|---|---|---|
| CA | 2352761 A1 | 6/2000 |
| EP | 1500018 A1 | 10/2003 |
| WO | 01/27839 A1 | 4/2001 |
| WO | 2007/127226 A2 | 11/2007 |
| WO | 2008/027895 A2 | 3/2008 |
| WO | 2009/029726 A1 | 3/2009 |

OTHER PUBLICATIONS

Regulation of Fuels and Fuel Additives: Changes to Renewable Fuel Standard Program. The Federal Register / FIND75. 058. (Mar. 26, 2010).*
Related PCT Application No. PCT/CA2009/000281 International Search Report mailed Jul. 21, 2009.
Related PCT Application No. PCT/CA2009/000281 Written Opinion mailed Jul. 21, 2009.

(Continued)

*Primary Examiner* — Ryan Zeender
*Assistant Examiner* — Fawaad Haider
(74) *Attorney, Agent, or Firm* — Perry + Currier Inc.; Kristjan Spence

(57) ABSTRACT

According to embodiments described in the specification, a method, system and apparatus for managing inventory are provided. The method comprises storing at least one job record in a memory, the at least one job record comprising a first of a plurality of job identifiers and at least a first subcomponent identifier; receiving a transaction record comprising a second subcomponent identifier; and storing the transaction record in the memory in association with one of the plurality of job identifiers.

5 Claims, 9 Drawing Sheets

(56) References Cited

OTHER PUBLICATIONS

PCT International Application No. PCT/CA2011/001389 Search Report dated Jan. 31, 2012.

PCT International Application No. PCT/CA2011/001389 Written Opinion dated Jan. 31, 2012.

* cited by examiner

300

304

METHOD, SYSTEM AND APPARATUS FOR MANAGING INVENTORY

FIELD

The specification relates generally to inventory management, and more particularly to a method, system and apparatus for managing inventory.

BACKGROUND

The production of goods such as packaging materials involves various challenges. Production can be characterized by high variability in the nature of goods being produced, as well as short production runs. Thus, frequent and numerous movements of inventory are often required, and a high degree of flexibility is necessary to supply and complete orders. Competing with the need for flexibility is the need to document production for tracking and purchasing purposes. Attempts to balance these needs results in inefficient use of resources.

BRIEF DESCRIPTIONS OF THE DRAWINGS

Embodiments are described with reference to the following figures, in which.

Figure 2:
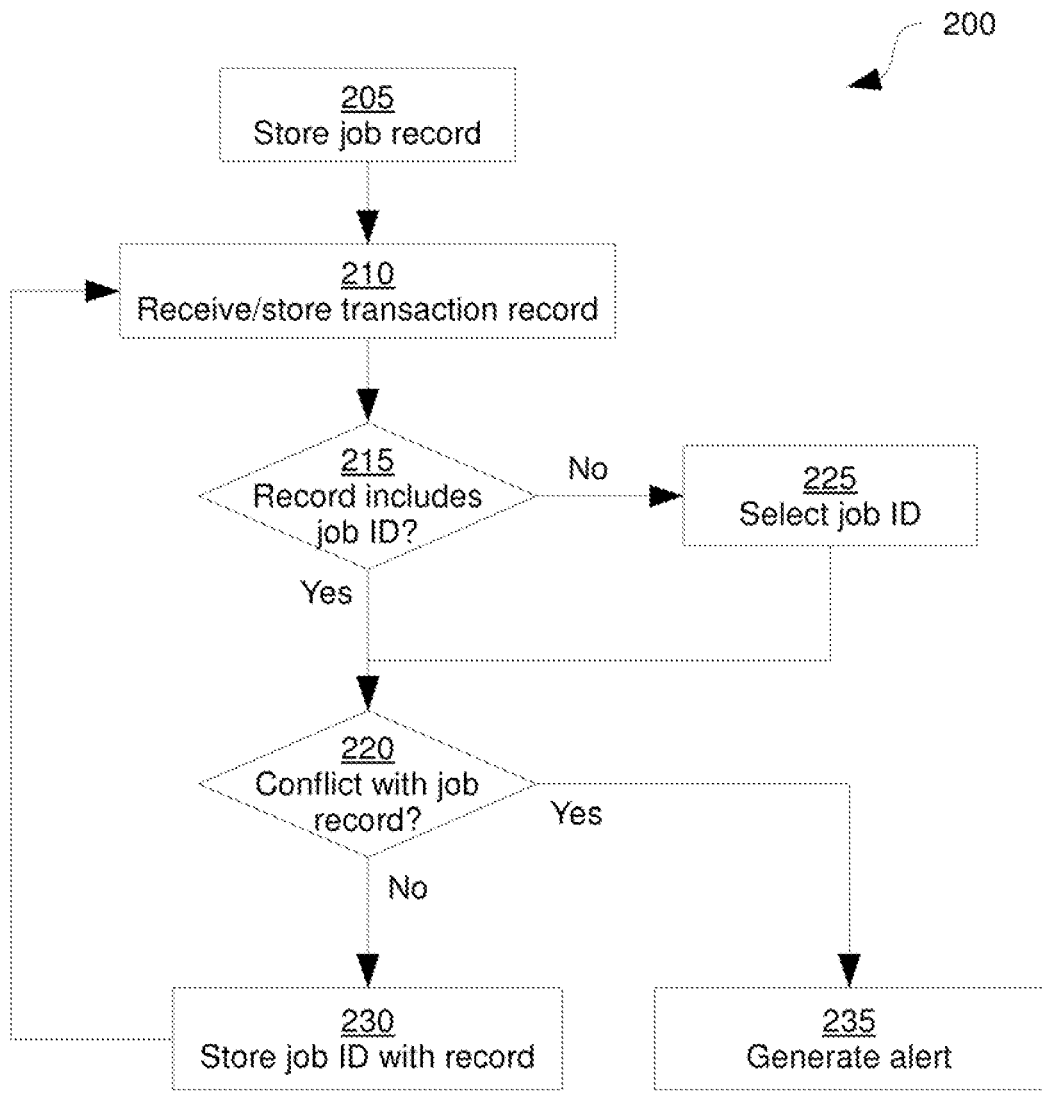
FIG. 2 depicts a method of managing inventory, according to a non-limiting embodiment.
Figure 4:
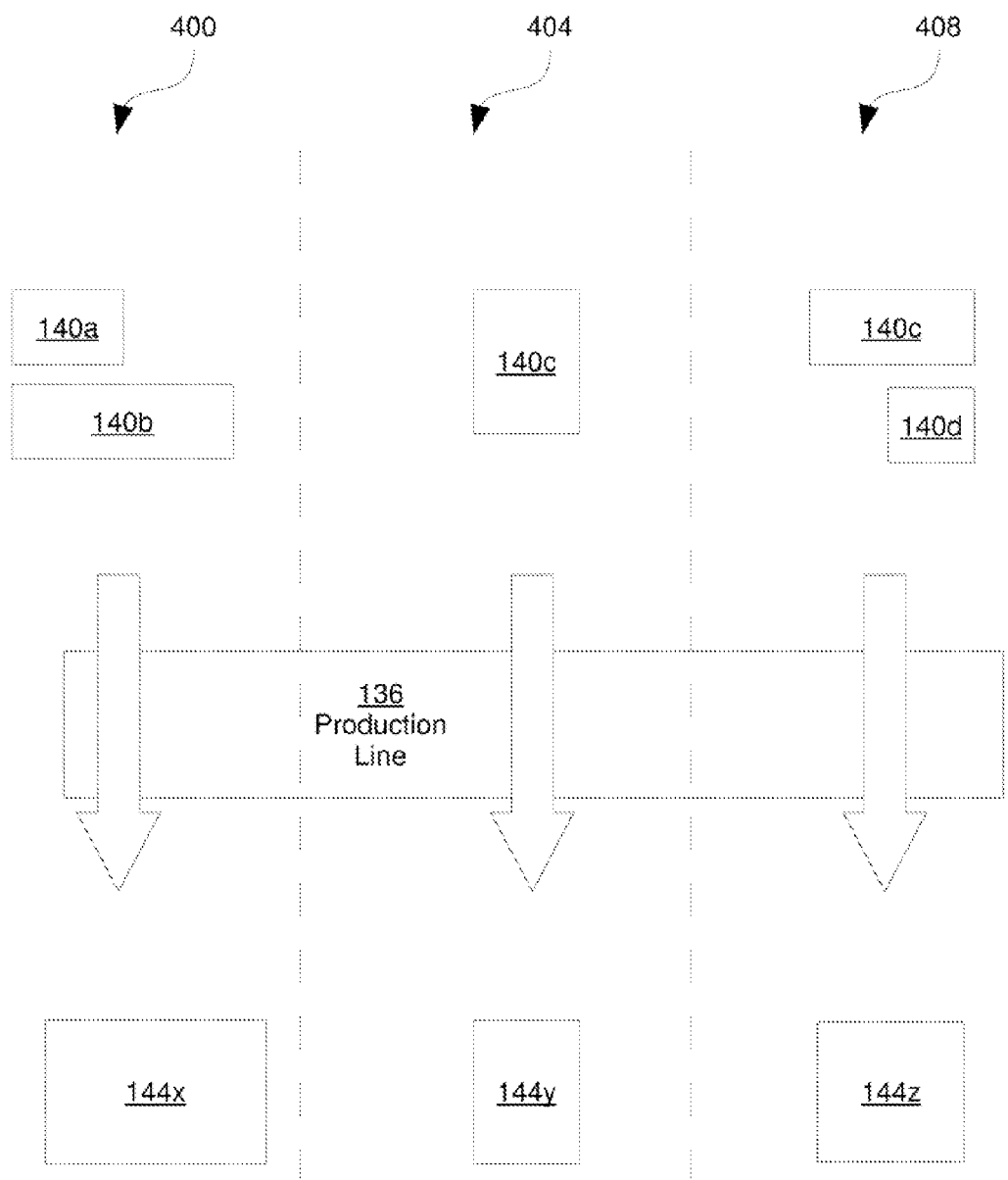
Figure 5:
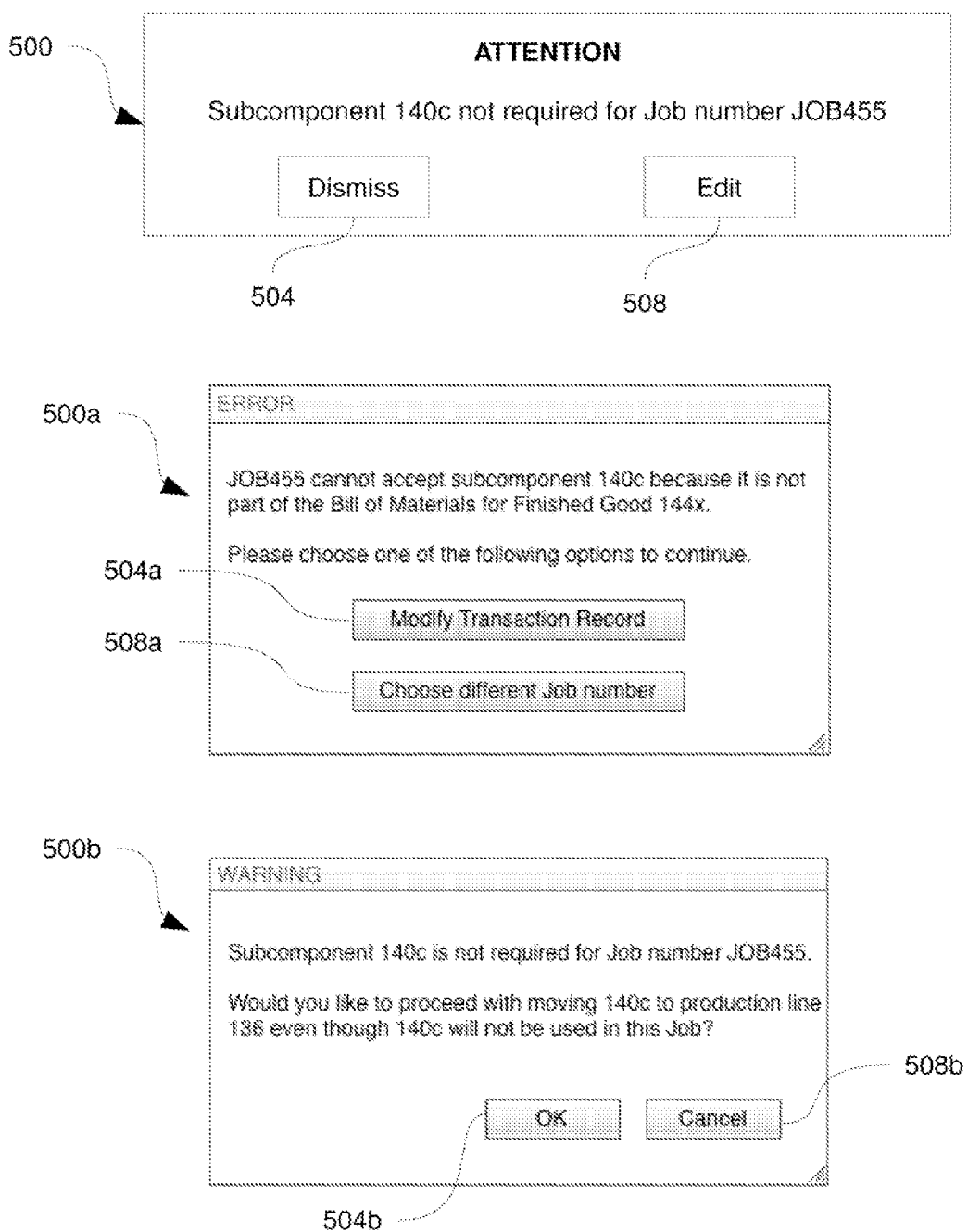
Figure 6:
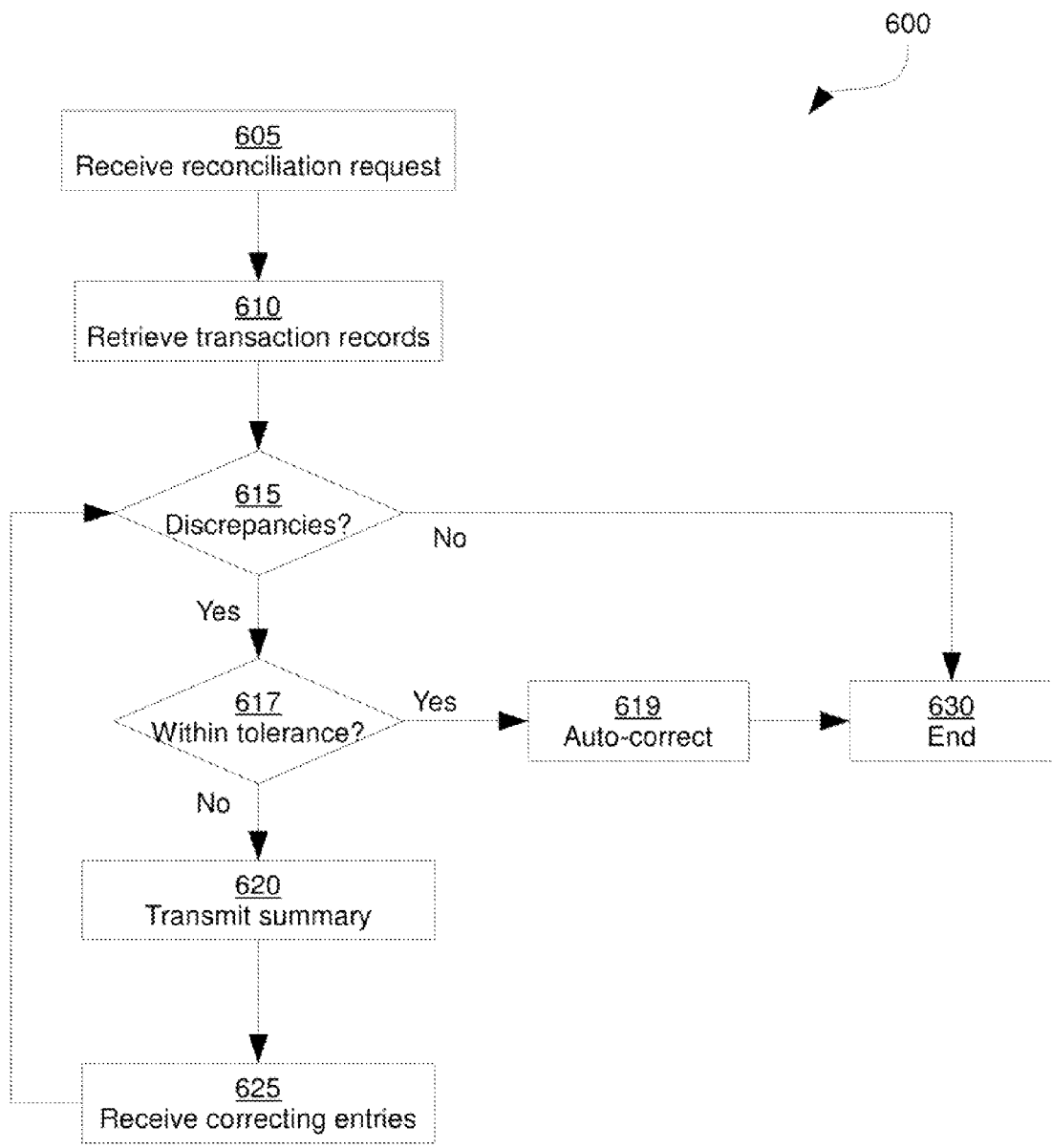
Figure 7:
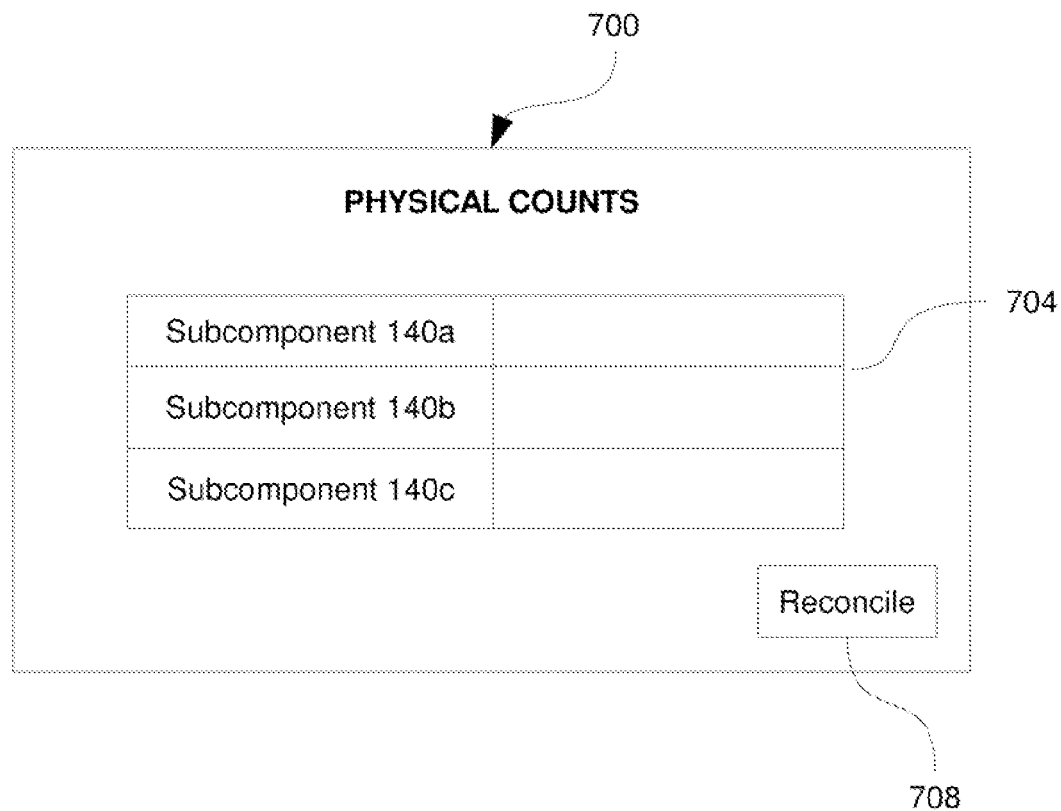
Figure 8:
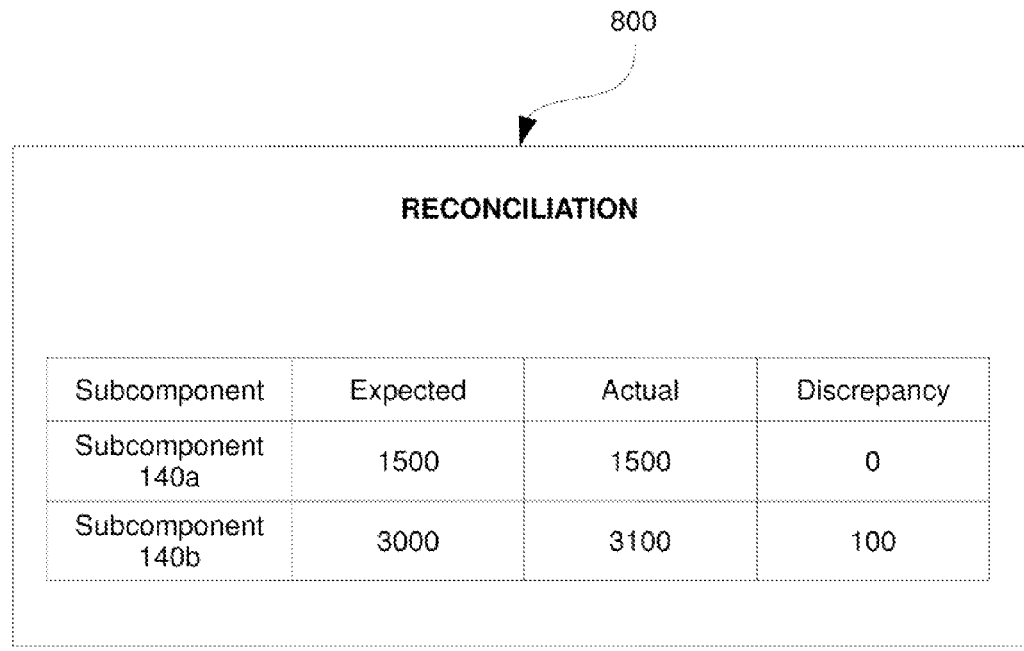
Figure 9:
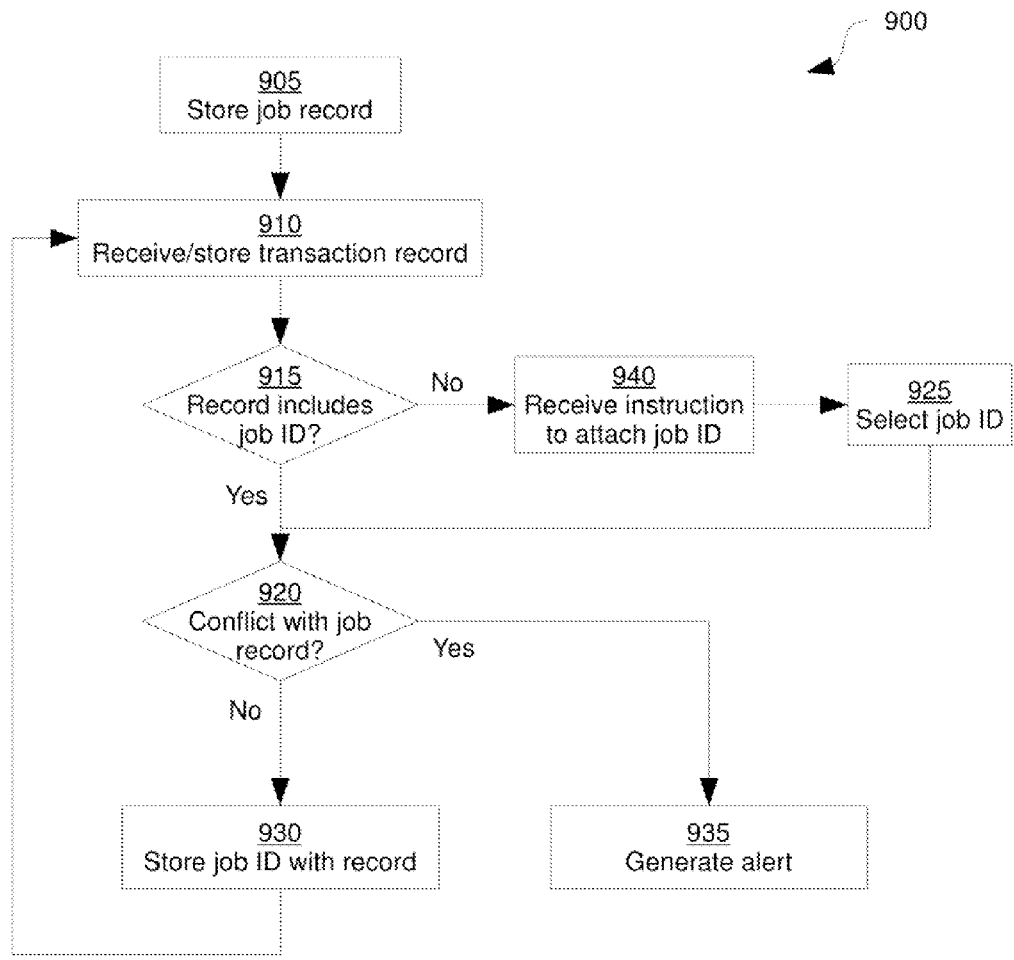

FIG. 4 depicts a schematic representation of inventory tracking enabled by the method of FIG. 2, according to a non-limiting embodiment FIG. 5 depicts an interface generated at block 235 of FIG. 2, according to a non-limiting embodiment FIG. 6 depicts a further method of managing inventory, according to a non-limiting embodiment FIG. 7 depicts an interface used in the generation of a request received at block 605 of FIG. 6, according to a non-limiting embodiment FIG. 8 depicts an interface generated at block 620 of FIG. 6, according to a non-limiting embodiment; and FIG. 9 depicts a method of managing inventory, according to another non-limiting embodiment.

DETAILED DESCRIPTION OF THE EMBODIMENTS

According to an aspect of the specification, a method of managing inventory is provided, the method comprising: storing at least one job record in a memory, the at least one job record comprising a first of a plurality of job identifiers and at least a first subcomponent identifier; receiving a transaction record comprising a second subcomponent identifier; and storing the transaction record in the memory in association with one of the plurality of job identifiers.

According to a further aspect of the specification, a non-transitory computer-readable medium is provided, storing computer-readable instructions executable by a processor for implementing the above method.

According to another aspect of the specification, a server is provided comprising: a memory; a communications interface; and a processor interconnected with the memory and the communications interface, the processor configured to store at least one job record in the memory, the at least one job record comprising a first of a plurality of job identifiers and at least a first subcomponent identifier; the processor further configured to receive a transaction record via the communications interface, the transaction record comprising a second subcomponent identifier; the processor further configured to store the transaction record in the memory in association with one of the plurality of job identifiers.

Figure 1:
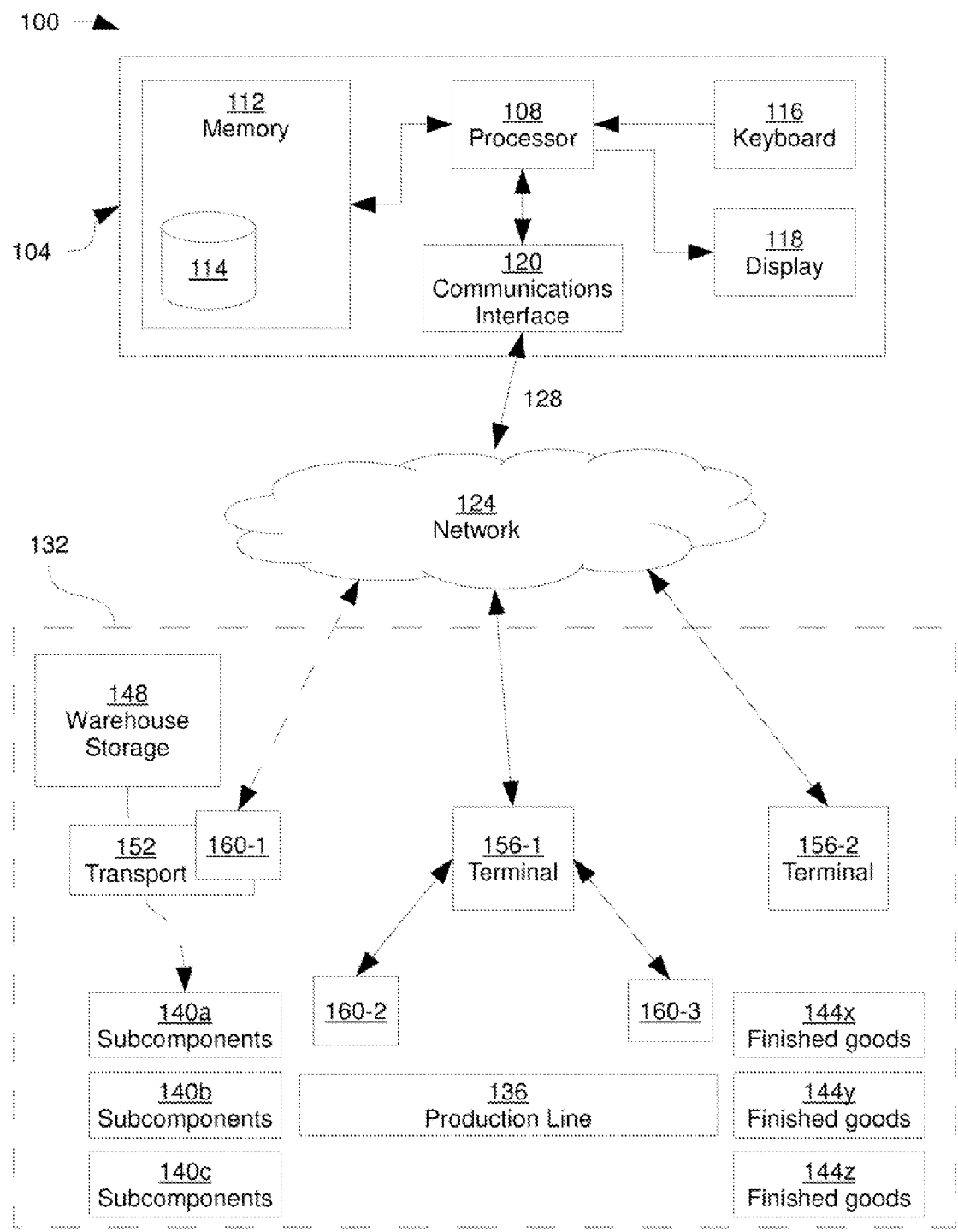
FIG. 1 depicts an inventory management system, according to a non-limiting embodiment.

FIG. 1 depicts a schematic representation of an inventory management system 100. System 100 includes a server 104, which can be based on any known server architecture, and thus generally includes one or more enclosures housing one or more processors, along with associated memories and communications interfaces. In the presently described embodiment, server 104 includes a processor 108 interconnected with a non-transitory computer readable storage medium such as a memory 112. Memory 112 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. Memory 112 maintains a data store 114, as will be discussed in further detail below. Memory 112 also maintains computer-readable instructions executable by processor 108. Such instructions include, for example, an operating system and one or more applications. Processor 108, via execution of such instructions, is configured to carry out various actions, as will be discussed below.

Server 104 can also include input and output devices interconnected with processor 108, such as a keyboard 116 and a display 118, respectively. It is contemplated that other input and output devices can also be used with server 104, including, for example, touch screens, speakers, microphones and the like. In other embodiments, keyboard 116 and display 118 can be omitted and server 104 can be managed from a terminal, such as a personal computer with associated input and output devices, connected with server 104. Such a terminal can be located, for example, within the same facility as server 104. In other embodiments, such a terminal can be located remotely from server 104 and can interact with server 104 over a Wide Area Network ("WAN") such as the Internet. Terminals can include desktop computers as well as various mobile computing devices, such as laptop computers, mobile phones, tablet computers and the like.

Server 104 also includes a communications interface 120 for connecting server 104 to a network 124 via a link 128. Network 124 can include any suitable combination of wired and/or wireless networks, including but not limited to a WAN such as the Internet, a Local Area Network ("LAN"), cell phone networks, WiFi networks, WiMax networks and the like. Link 128 can therefore be selected for compatibility with communications interface 120 and network 124. In the present embodiment, link 128 is a wired link (e.g. an Ethernet-based link). However, it is also contemplated that in some embodiments, link 128 can be a wireless link with communications interface 120. In such embodiments, link 128 will be understood as also including any necessary backhaul links with network 124.

Server 104 is configured to manage inventory for a production site 132 included in system 100. Production site 132 is generally housed within a particular facility, such as a packaging manufacturing facility. It will be understood, however, that production site 132 can include a plurality of facilities. In some embodiments, each of the facilities can be operated by the same entity. In other embodiments, each of the plurality of facilities need not be operated by the same entity. It is contemplated that although server 104 and network 124 are not shown within production site 132, in some embodiments server 104 can be located within production site 132 and network 124 can be, for example, a LAN at production site 132.

Production site 132 includes one or more production lines, such as production line 136, which can include various equipment necessary for the conversion of subcomponents 140 into finished goods 144. It will be appreciated that various types of subcomponents, including but not limited to subcomponents 140a, 140b and 140c (generically referred to as subcomponents 140), can be combined and otherwise operated on to produce various types of finished goods 144, such as finished goods 144x, 144y and 144z. It is contemplated that any given finished good 144 can require any combination of subcomponents 140. Thus, some finished goods 144 may require the same subcomponents 140 as other finished goods 144, while other finished goods 144 may require a partially or entirely different set of subcomponents 140. It is contemplated that there may be more or less than three types of subcomponents 140. It is also contemplated that there may be more or less than three types of finished goods 144, and that the number of types of subcomponents 140 need not match the number of types of finished goods 144.

Production site 132 can also include a warehouse storage area 148 (referred to hereinafter as "warehouse storage 148") or any other suitable form of inventory storage, in which subcomponents 140 are stored prior to their delivery to production line 136 for conversion. It is contemplated that in the presently described embodiment, warehouse storage 148 is located within the same facility as production line 136. However, in other embodiments, warehouse storage area 148 can be located in a separate facility. Delivery of subcomponents 140 from warehouse storage 148 to production line 136 can be accomplished, for example, by a transport device 152 such as a forklift.

Following delivery of subcomponents 140 to production line 136, at least a portion of subcomponents 140 can be engaged into production line 136 for conversion. Following any suitable combination of operations carried out at production line 136, subcomponents 140 are converted into finished goods 144. Finished goods 144 can then be transferred to additional warehouse storage (not shown) or back to warehouse storage 148. Finished goods 144 can also be shipped directly out of production site 132 or transferred to another production line (not shown) within production site 132 for further work.

System 100, and more particularly production site 132, further includes one or more terminals 156 connected to network 124. Each terminal 156 can be a conventional computing device, having an enclosure housing a processor and a memory, and coupled to input devices such as a keyboard and a mouse, and coupled to output devices such as display. In some embodiments, a touch screen (providing both input and output functionality) can be provided instead of, or in addition to, the above-mentioned input and output devices. Terminal 156-1 is shown as being associated with production line 136. That is, terminal 156-1 can be located proximal to production line 136 in order to readily receive input data concerning the conversion of subcomponents 140 into finished goods 144 during such conversion. Other terminals, such as terminal 156-2, can be located elsewhere within production site 132 (i.e. more distant from production line 136 than terminal 156-1). Still other terminals (not shown) can be located elsewhere within production site 132, outside of production site 132, or both. It is contemplated that terminals 156 can be desktop computers as well as various mobile computing devices, such as laptop computers, mobile phones, tablet computers and the like.

System 100 further includes a plurality of peripheral devices 160 located at production site 132. Peripherals 160 can be, for example, bar-code or Radio-Frequency Identification ("RFID"), readers or any other suitable computing devices for scanning or otherwise recording data representing inventory at various instances, as will be discussed in further detail below. Some peripherals 160, such as peripheral 160-1, can be mobile computers configured to connect directly to network 124, for example via a wireless link. Other peripherals, such as peripherals 160-2 and 160-3, can be configured to connect to a terminal such as terminal 156-1 (which is in turn connected to network 124) via wired or wireless links.

As will be discussed below in greater detail, peripherals 160 and terminals 156 can generate transaction records containing data representative of inventory movements within production site 132. Server 104 is configured to receive, store and process such transaction records.

Turning to FIG. 2, a schematic representation of a method 200 of managing inventory is depicted. Method 200 will be discussed in conjunction with its performance on system 100, though it is contemplated that method 200 can also be implemented on any other suitable system.

Beginning at block 205, processor 108 of server 104 is configured to store a job record in data store 114. A job is generally referred to as an object or other collection of data relating to the production of a finished good. Thus, a job can include data specifying an expected quantity of a finished good to be produced, the expected number of staff to be involved in such production and any other details relevant to the production, such as start and end times and the like. For example, a job can contain data specifying the expected production of one thousand units of finished good 144x during an eight-hour shift at production line 136. Once actual, physical production begins, the job will also contain data describing, for example, actual start and end times, actual number of staff involved and the like. It is contemplated that system 100 can track a plurality of jobs each describing a block of production to be executed on production line 136 during a given time period (such as one shift). That is, various quantities of different types of finished goods 144 can be produced at production line 136.

A job record can include a bill of materials for the job, an indication of the quantity of the finished good 144 to be produced, an indication of the customer for which the job is being performed, records of time that work was performed on the job, and the like. Of particular relevance for the performance of method 200, the job record includes identifications of the subcomponents 140 required for the job, and a job identifier, or "job ID". The job ID can be any suitable combination of numbers, letters and other characters or symbols that uniquely identifies the job among other jobs for which job records are stored in data store 114.

Figure 3:
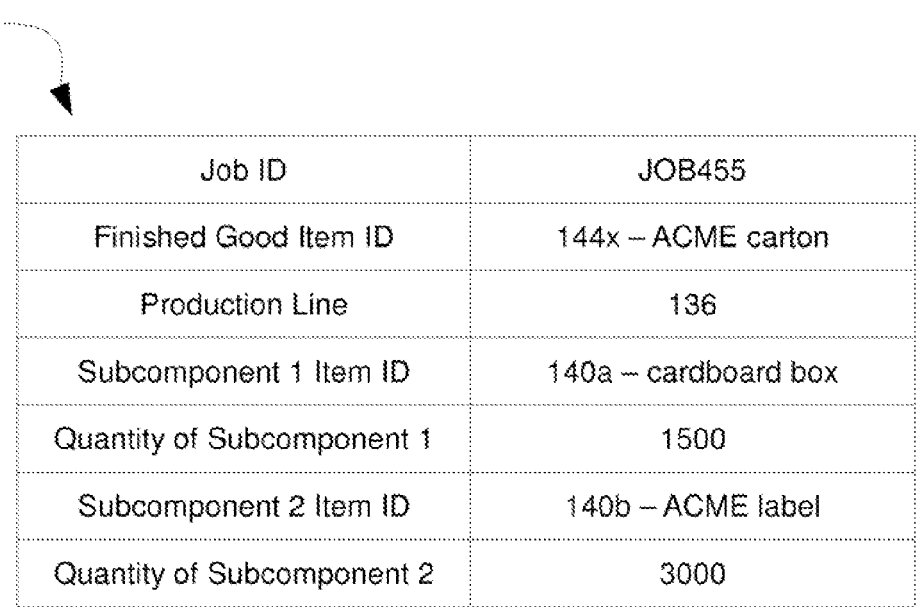
FIG. 3 depicts an example job record and transaction record, according to a non-limiting embodiment.
Figure 3:
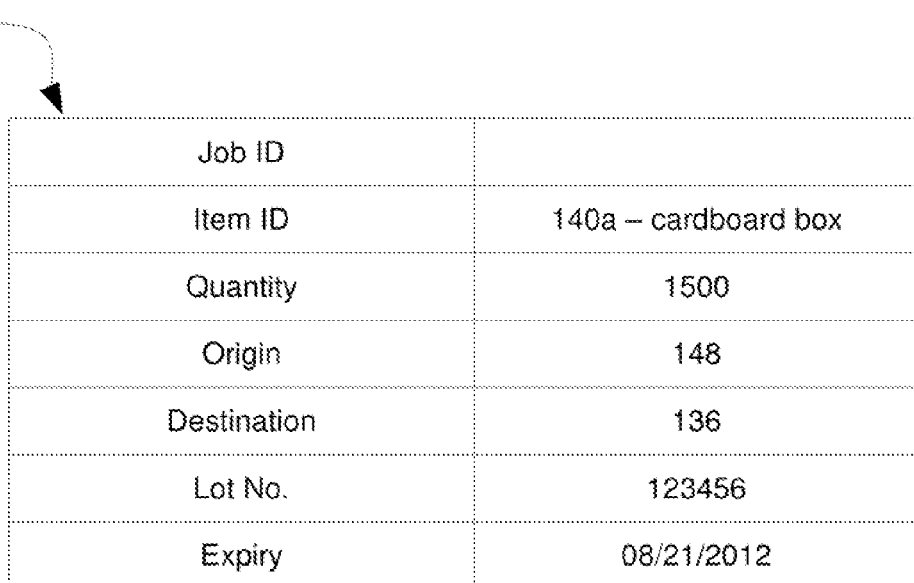

Referring briefly to FIG. 3, an example job record 300 is shown. Job record 300 is simplified for the present description of the performance of method 200, and it is contemplated that job record 300 can contain additional data beyond that described below. Briefly, job record 300 contains data describing a job in which a quantity of a finished good 144 is to be produced. Job record 300 includes a job ID ("JOB455") and an item identifier for the finished good 144 to be produced. For illustrative purposes, JOB455 involves the production of finished good 144x, a carton for a customer named "ACME". It is contemplated that job record 300 need not include the descriptive labels (e.g. "cardboard box") associated with finished good and subcomponent item identifiers as shown in FIG. 3. Job record 300 also includes an identifier for the production line to be used in completing the job ("136"). Job record 300 further includes item identifiers for the subcomponents 140 required for the job and indications of the required quantities of each subcomponent. In the present example, job JOB455 thus requires 1500 of subcomponent 140a (a cardboard box) and 3000 of subcomponent 140b (a label).

It is contemplated that although job record 300 is shown in a tabular format, job record 300 can be maintained in data store 114 in any suitable format. It is also contemplated that job record 300 can contain a reference to other records. For example, rather than containing subcomponent identifiers and quantities, job record 300 can contain a reference to another record in data store 114 which contains that data.

Referring back to FIG. 2, performance of method 200 continues at block 210. At block 210, processor 108 is configured to receive a transaction record and store the transaction record in data store 114. In general, a transaction record contains data describing a movement of inventory, whether subcomponent or finished goods. Turning again to FIG. 3, an example transaction record 304 is shown. Transaction record 304 contains an identifier of the inventory concerned (subcomponent 140a), the quantity of subcomponent 140a moved (1500), and the lot number (or numbers) and expiry date (or dates) for the quantity of subcomponent 140a being moved. Transaction record 304 also includes indications of the origin and destination of the quantity of subcomponent 140a. In the example of FIG. 3, transaction record 304 indicates that 1500 units of subcomponent 140a were removed from warehouse storage 148 and arrived at production line 136.

It is contemplated that transaction record 304, which may also be referred to as an inventory transaction, can be generated and transmitted to server 104 in a variety of ways. Returning to FIG. 1, transaction record 304 can be generated for transmission to server 104 by any of terminals 156 and peripherals 160. For example, terminal 156-2 can be configured to generate an interface on the associated display. The interface can include fields or other interface elements which allow terminal 156-2 to receive input data (e.g. from a keyboard) representative of the movement of subcomponent 140a from warehouse storage 148 to production line 136. Such an interface can, for example, include a field into which the subcomponent identifier "140a" may be entered, as well as fields into which the quantity (e.g. 1500), origin and destination locations can be entered. It is also contemplated that one or both of origin and destination locations can be determined automatically by terminal 156 or server 104. For example, production site 132 can include an indoor GPS system (not shown) or an RFID system coupled to terminals 156 and peripherals 160 which allows for the automatic determination of locations. Terminal 156-2 can thus receive the above-mentioned data and transmit the data to server 104 as transaction record 304.

Transaction records can also be generated by peripherals 160. For example, in the present performance of method 200, it will be assumed that the movement of subcomponent 140a can be recorded by peripheral 160-1. Peripheral 160-1 can record the removal of subcomponent 140a from warehouse storage and placement onto transporter 152. Peripheral 160-1 can then also record the placement of subcomponent 140a at production line 136 and thereafter generate and transmit transaction record 304. A further transaction record can be transmitted to server 104 by peripheral 160-2 in conjunction with terminal 156-1 when the quantity of subcomponent 140a is engaged into production line 136 for conversion. Such a transaction record (not shown) describes a movement of subcomponent 140a from a holding or storage area at the "start" of production line 136 into production line 136 itself. A still further transaction record can be generated indicating a movement of finished good 144x from within production line 136 to a holding or storage area at the "end" of production line 136.

It is contemplated that while some transaction records can be generated substantially in real-time with the activities they document—such as transaction record 304 as generated by peripheral 160-1 above—other transaction records can be received by server 104 either before or after the activities they document have taken place. For example, terminal 156-2 can be used to plan production for a future shift. As such, transaction records representing planned future movements of subcomponents from warehouse storage 148 to production line 136 can be generated at terminal 156-2. As a further example, data can be entered at terminal 156-1 in response to the arrival of subcomponents 140 at production line 136 for which no transaction records were generated. That is, if peripheral 160-1 was not operational or not used when subcomponent 140a was removed from warehouse storage 148 and transported to production line 136 as described above, that movement can be documented later at terminal 156-1, which will then generate one or more transaction records for transmission to server 104.

Returning to FIG. 2, at block 215 of method 200, processor 108 of server 104 is configured to determine whether transaction record 304 received at block 210 includes a job ID. As seen from FIG. 3, transaction record 304 includes a job ID field, and the determination at block 215 can therefore be made by inspecting the job ID field transaction record 304 to determine whether it contains data. When the determination at block 215 is affirmative—that is, when the transaction record received at block 210 includes a job ID—performance of method 200 proceeds to block 220, where a conflict check is performed, as will be described below. A transaction record can include a job ID, for example, when the job ID was received as input data at the peripheral 160 or terminal 156 which generated the transaction record.

In the present example performance of method 200, however, the determination at block 215 is negative because transaction record 304, as seen in FIG. 3, does not include a job ID (the job ID field is empty). Performance of method 200 therefore proceeds from block 215 to block 225, at which processor 108 is configured to select a job ID to associate with transaction record 304. It is contemplated that selection of a job ID at block 225 can be accomplished in a variety of ways. For example, transaction record 304 could include an indication (not shown) of the interface which was used to generate transaction record 304. That is, transaction record 304 could have been generated by terminal 156-2 following receipt of input data at an interface which is associated with a particular job. It could therefore be inferred by processor 108 that transaction record 304 should be associated with that same job.

In the present performance of method 200, it will be assumed that transaction record 304 was generated by peripheral 160-1 without any indication of a particular interface linked to a job. Thus, transaction record 304 cannot be clearly associated with a job ID as described above. Therefore, processor 108 is also configured to perform further determinations as part of the performance of block 225. For instance, processor 108 can be configured to compare the subcomponent identifier (140a) in transaction record 304 with subcomponent identifiers included in job record 300 and any other job records (not shown) stored in data store 114. If job record 300 is the only job record including a reference to subcomponent 140a that exists in data store 114, processor 108 is configured to select the job ID of job record 300 for association with transaction record 304.

In the present example performance of method 200, the scope of the above determination can be reduced because transaction record 304 includes an identifier for production line 136. Thus processor 136 can be configured to compare the subcomponent identifier of transaction record 304 with only job records that include the same production line identifier as transaction record 304. Processor 108 can also be configured to determine whether there is only a single job at production line 136. If job record 300 is the only active job record in data store 114 for production line 136, processor 108 can be configured to associate the job ID "JOB455" shown in FIG. 3 with transaction record 304 without comparing subcomponent identifiers. In other embodiments, processor 108 can be configured to perform any suitable combinations of the above determinations in the performance of block 225. That is, processor 108 can be configured to compare subcomponent identifiers in addition to determining whether job record 300 represents the only active job record associated with production line 136.

In still other embodiments, processor 108 can be configured to select the job ID of the first scheduled job for production line 136 as identified in transaction record 304. It is contemplated that job records can include start and end times or indicators specifying the order in which the jobs are to be completed. Processor 108 can thus select the job ID with the earliest start time or order of execution for association with the transaction record. As above, processor 108 can be configured to make this type of selection instead of, or in addition to, subcomponent identifier comparisons. Examination of scheduled job times can be used when subcomponent identifier comparisons are inconclusive (that is, when multiple job records associated with production line 136 require the same subcomponents).

Thus, in the present example performance of method 200, processor 108 determines at block 225 that job record 300 is the only active job record in data store 114 that includes a reference to subcomponent 140a. Processor 108 therefore selects job ID "JOB455" at block 225.

Following selection of a job ID at block 225, performance of method 200 proceeds to block 220 for a conflict check to be described in further detail below, and (dependent on the results of the conflict check) then to block 230, where the selected job ID is stored in data store 114 in association with transaction record 304. It is contemplated that transaction record 304 can be modified in order to insert the job ID "JOB455" into the job ID field of transaction record 304.

It will now be apparent that as a result of the performance of method 200, each transaction record received at server 104 is maintained in data store 114 in association with a job ID. Thus, the transaction records in data store 114 allow server 104 to track inventory at production line 136 substantially in real-time on a job-specific basis. Referring now to FIG. 4, a schematic illustration of such job-based tracking is shown. FIG. 4 depicts production line 136, in which subcomponents 140 are converted into finished goods 144. In particular, three jobs 400, 404 and 408 are depicted. Jobs 400, 404 and 408 can be executed serially over the course of an eight-hour shift, for example. In each job, subcomponents (for example, 140a and 140b for job 400, which corresponds to job record 300) are converted into a finished good (finished good 144x for job 400). It is contemplated that in some embodiments, jobs 400, 404 and 408 do not execute simultaneously on production line 136. Rather, a single job is performed at a given time, and the next job is performed following completion of the previous job. In other embodiments, one or more of jobs 400, 404 and 408 can execute simultaneously (i.e. in parallel) on production line 136. It is further contemplated that one or more of jobs 400, 404 and 408 can be switched from production line 136 to another production line (not shown) before completion, or terminated before completion. It is also contemplated that, for example, execution of job 404 can be put on hold for job 408 to be executed. Following completion, switching or termination of job 408, job 404 can then be resumed.

At production site 132, subcomponents 140 for all three jobs shown in FIG. 4 may be physically moved to production line 136, for example at the beginning of a shift during which the three jobs are scheduled to be completed. As can be seen from FIG. 4, some subcomponents 140 (such as subcomponent 140c) are used in more than one job. Thus, while a quantity of subcomponent 140c may be moved from warehouse storage 148 to production line 136, to be used for both jobs, it is recognized herein that it can be desirable to track which particular portions of inventory are used for each job. The performance of method 200 allows server 104 to track a conceptual job-level work-in-progress ("WIP") pallet for each one of jobs 400, 404 and 408, as shown by the dashed lines. In other words, while subcomponents for a plurality of jobs to be executed at production line 136 are stored in the same physical location prior to being engaged into production line 136 for conversion, the performance of method 200 allows for the tracking of subcomponents in multiple virtual locations, each defined by a combination of production line 136 (i.e. the physical location) and the job IDs attached to transaction records. As will be discussed below, server 104 can be further configured to make use of the above-mentioned conceptual division enabled by storing transaction records in association with job IDs.

Returning to FIG. 2, at block 220, prior to the storage of a job ID in association with transaction record 304, processor 108 is configured to determine if a conflict exists between transaction record 304 received at block 210 and job record 300 with a corresponding job ID. Such a determination includes comparing the data contained in transaction record 304 with the data contained in job record 300. For example, processor 108 can be configured to compare the subcomponent identifier in transaction record 304 with the subcomponent identifiers in job record 300. Thus, if a transaction record is received that indicates that a quantity of subcomponent 140c has been moved to production line 136 in association with job "JOB455" as shown in FIG. 3, processor 108 can determine that subcomponent 140c is not required for that job. In other instances, processor 108 can also compare the quantities of subcomponents already at production line 136 in associate with a particular job with the quantity indicated in the transaction record. Processor 108 can thereby determine if the transaction record represents a movement of an excessive or insufficient amount of subcomponent to production line 136.

Continuing with the present example performance of method 200, processor 108 will determine that no conflict exists between transaction record 304 and job record 300, as both contain references to subcomponent 140a and further, as the quantities of subcomponent 140a in transaction record 304 and job record 300 match. The determination at block 220 is therefore negative, and performance of method 200 proceeds to block 230 as described above, before returning to block 210 to await receipt of a further transaction record.

When the determination at block 220 is affirmative, however, performance of method 200 proceeds to block 235, at which processor 108 is configured to generate an alert. In particular, processor 108 is configured to transmit an instruction to the terminal 156 or peripheral 160 from which the transaction record was received. The instruction can cause the terminal 156 or peripheral 160 to generate an interface containing an identification of the conflict detected by processor 108. An example alert interface 500, generated on a display of peripheral 160-1, is shown in FIG. 5. Such an alert can be generated following the movement of subcomponent 140c to production line 136 by transport 152 in association with job ID "JOB455". As seen in FIG. 3, job JOB455 does not require subcomponent 140c, and thus the movement of subcomponent 140c to production line 136 may have been erroneous. Alternatively, the association of subcomponent 140c with job JOB455 may have been erroneous.

Interface 500 can include selectable elements such as "dismiss" element 504 and "edit" element 508. Receipt of input data at a peripheral 160 or terminal 156 representing selection of elements 504 or 508 can cause the peripheral 160 or terminal 156 to generate additional interfaces allowing the alert to be dismissed without changing the job ID or for the entry of a different job ID. Such interfaces can be generated at the peripheral 160 or terminal 156 with or without involvement from server 104. For example, selection of the "edit" element 508 can cause a terminal 156 to transmit a request to server 104 for a transaction record editing interface. In other embodiments, the request to the server may not be necessary.

It is contemplated that if the "edit" element 508 is selected, the job ID selected at block 225 or included with transaction record 304 can be replaced with a different job ID (for example, entered by way of an input device at a terminal 156) prior to storage of the job ID at block 230. It is contemplated that any suitable alert interface can be used at block 235. FIG. 5 includes two further example interfaces 500a and 500b. Interface 500a includes an element 504a for modifying transaction record 304 (for example, to change the production line identifier) and an element 508a for selecting a different job number to be associated with transaction record 304. Interface 500b includes an element 504b for dismissing the alert and proceeding to block 230 irrespective of the conflict detected at block 220. Interface 500b also includes an element 508b which can abort the storage of transaction record 304 and return to an earlier block of method 200 or to an interface which allows for the selection of a different job ID. It will now be apparent that a wide variety of suitable alert interfaces exist.

It is contemplated that in some embodiments, block 220 can be omitted, or performance of block 230 can precede the performance of block 220. That is, in such embodiments a job ID can be stored in association with a transaction record in data store 114 prior to the conflict check performed at block 220. In such embodiments, selection of the "edit" element 508 and receipt of further input data representing a new job ID can result in the retrieval and editing of the job ID stored at block 230 as described above, or in the generation of a further transaction record for transmission to server 104, where it will be processed according to method 200. Such a transaction record could, for example, indicate that the quantity of subcomponent 140c has been moved from one job to another at production line 136. In other words, although there may be no physical movement of the inventory, the virtual location of the inventory (as defined by the combination of production line identifier and job ID) as discussed in connection with FIG. 4 has changed. Thus, there has been a conceptual movement of subcomponent 140c from one of the job-level WIP pallets shown in FIG. 4 to another.

Turning now to FIG. 6, a schematic representation of a method 600 for managing inventory is depicted. Method 600 will be described in conjunction with its performance on system 100, though it is contemplated that method 600 can be performed on any suitable system. It is also contemplated that the performance of method 600 can follow the performance of method 200, and can also occur during the performance of method 200.

Beginning at block 605, processor 108 of server 104 is configured to receive a reconciliation request from, for example, terminal 156-1. Such a request can be generated by terminal 156-1 following completion of a job, or of a shift or other time period in which more than one job may have been completed. In general, the reconciliation request represents an instruction to server 104 to determine whether any discrepancies exist in the tracking of inventory in connection with one or more jobs. The reconciliation request therefore includes at least one job ID.

The reconciliation request can also include additional items of data regarding the job or jobs identified in the request. For example, the request can include a final count of the actual quantity of one or more subcomponents which were consumed during the job, and certain attributes of subcomponents such as lot codes, serial numbers, or expiry dates. In other embodiments, a final count of the actual quantity of a finished good produced during a job can be included instead of, or in addition to, the subcomponent count. Referring to FIG. 7, an example interface 700 is shown. Interface 700 can be generated by, for example, terminal 156-1 and enables terminal 156-1 to receive input data for generating the reconciliation request. Interface 700 thus includes fields 704 for receiving counts of the remaining subcomponents, and an interface element 708 which causes the reconciliation request to be transmitted, including the entered counts. It is contemplated that interface 700 can be presented for generating a reconciliation request for a single job, or for more than one job (for example, for all the jobs executed at production line 136 during a given shift).

In the present example performance of method 600, the reconciliation request indicates that zero units of subcomponent 140a remain and that one hundred units of subcomponent 140b remain.

Referring again to FIG. 6, proceeding to block 610, processor 108 is configured to retrieve any transaction records having a job ID corresponding to the job ID in the request from data store 114. Retrieval can be carried out by, for example, a database lookup. Continuing from the example performance of method 200, processor 108 can retrieve transaction record 304 and a further transaction record detailing a movement of 3200 units of subcomponent 140b to production line 136. Once the retrieval is complete, performance of method 600 continues at block 615.

At block 615, processor 108 is configured to determine whether there are any discrepancies in the transaction records associated with the job ID specified in the request. In general, a discrepancy is a difference between the expected performance of production line 136 and the actual performance, according to the counts received with the reconciliation request at block 605. At block 615, processor 108 is configured to determine, based on the counts, how much of each subcomponent was consumed. Thus, processor 108 will determine that all of subcomponent 140a was consumed (transaction record 304 indicated a movement of 1500 units and no remainder was reported) and that 3100 units of subcomponent 140b were consumed (the above-mentioned transaction record indicated a movement of 3200 units and a remainder of 100 units was reported).

Following the above calculation, processor 108 determines the expected consumption of each subcomponent. That is, job record 300 indicates a requirement for 1500 units of subcomponent 140a and 3000 units of subcomponent 140b. Assuming that processor 108 received a transaction record indicating that the desired quantity of finished good 144x was produced, the expected consumption is therefore as specified in job record 300. If a transaction record was received indicating that more or less than the expected quantity of finished good 144x was produced, processor 108 can adjust the expected consumption accordingly.

Processor 108 is then configured to determine if a difference exists between the actual and expected data determined above. In the present example performance, therefore, the determination will be affirmative, as more (3100) of subcomponent 140b was consumed than expected (3000).

When the determination at block 615 is negative (i.e. no discrepancies), method 600 ends at block 630. When, as in the present example, the determination is affirmative, method 600 proceeds to block 617. At block 617, processor 108 is configured to determine whether the discrepancies fall with a predetermined configurable tolerance. For example, processor 108 can be configured to determine that a discrepancy of less than 5% of the total required quantity of a subcomponent (as specified in the job record) is within the level of tolerance. In certain embodiments, an absolute tolerance (for example, two hundred units) could be specified rather than a fraction. In the present performance, the discrepancy of 100 units is less than 5% of the total (3000) quantity of subcomponent 140b required according to job record 300. Thus, the loss of 100 units of subcomponent 140b during production (for example, due to rejection, damage, inaccurate original count and the like) can be considered "acceptable" and method 600 can proceed to block 619. At block 619, processor 108 is configured to automatically generate correcting entries to account for the discrepancies detected at block 615. The correcting entries can be formatted as transaction records, and can therefore include data describing inventory movements that may not have been accurately captured, or captured at all, during production. For example, a correcting entry can be generated indicating that one hundred units of subcomponent 140b exited production line 136 as rejects. Method 600 then ends at block 630.

When the determination at block 617 is negative (i.e. the discrepancies are too large to be corrected automatically), performance of method 600 continues to block 620. At block 620, processor 108 is configured to transmit a summary of the retrieved transaction records to terminal 156-1. Such a summary can include the actual and expected totals calculated at block 615, for example. The summary can also include an indication of the discrepancy or discrepancies located at block 615. The transmission of the summary is an instruction for causing terminal 156-1 to generate an interface representing the summary. FIG. 8 shows an example summary interface 800.

Following the display of summary interface 800, terminal 156-1 can be configured to receive correcting entries via an input device such as a keyboard. As with the automatically generated entries, these correcting entries can be formatted as transaction records, and can therefore include data describing inventory movements that may not have been accurately captured, or captured at all, during production. The correcting entries are received at server 104 at block 625 of method 600. Processor 108 is configured to store the correcting entries in data store 114, and to return to block 615. At block 615, a further determination is performed by processor 108 as to whether there are any remaining discrepancies. When the determination at block 615 is negative (i.e. all inventory is accounted for), performance of method 600 ends at block 630.

Certain advantages to the methods and systems described above will now occur to those skilled in the art. For example, the storage of transaction records in association with job IDs can reduce usage of the computational resources of server 104 in performing the validation activities at block 230 of method 200 and the reconciliation activities in method 600. This reduction can be achieved as a result of the smaller data set to be processed. That is, the performance of blocks 610 and 615 in connection with transaction records lacking job IDs would require the retrieval and comparison of transaction records for other jobs. Processor 108 would thus also need to be configured to determine which transaction records are associated with which jobs when performing reconciliation. Additional advantages may also occur to those skilled in the art.

Referring now to FIG. 9, a method 900 is shown, which is a variation of method 200 as described above. The blocks of method 900 in which the final two digits correspond to the final two digits of blocks in method 200 are performed as described above. Thus, blocks 905, 910, 915, 920, 925, 930 and 935 are as described above in connection with blocks 205, 210, 215, 220, 225, 230 and 235, respectively. Method 900, however also includes block 940. At block 940, having determined that transaction record 304 does not include a job ID, processor 108 is configured to receive an instruction to attach a particular job ID to relevant transaction records.

The instruction received at block 940 can be received at a later time. That is, the current performance of method 900 can be effectively put "on hold" until receipt of the instruction at block 940. More specifically, the instruction at block 940 can be received from terminal 156-1 or peripheral 160-2 in conjunction with terminal 156-1. The instruction can include a job ID, and can thus be an indication that execution of the identified job is beginning. In other words, subcomponents that arrive at production line 136 can generate transaction records without job IDs (because, for example, the relevant job ID does not yet exist or because it is not yet known which job the subcomponents will be used in) and those transaction records can remain without job IDs until production actually begins. At that point, performance of method 900 resumes with the receipt of the instruction at block 940. Proceeding to block 925, the job ID that is selected is the job ID included in the instruction. Processor 108 can thus be configured to associate that job ID with the transaction record at block 920.

Processor 108 can be configured to carry out this process for multiple transaction records. In particular, processor 108 can be configured to retrieve all transaction records which refer to subcomponents identified in the job record with the same job ID as the instruction, and to modify those transaction records to include the job ID. All the subcomponents described by those transaction records are thus conceptually moved into the same virtual location as execution of the job begins.

It is also contemplated that processor 108 can receive an instruction (not shown) to release a quantity of subcomponents. For example, if a quantity of subcomponent 140c is moved to production line 136, it may all be associated with a given job ID following the performance of method 900 as a job that uses subcomponent 140c begins. However, there may be additional jobs which use subcomponent 140c, and therefore an excess of subcomponent 140c may be associated with the first job. Processor 108 can therefore be configured, for example following completion of the job, to retrieve transaction records for unused quantities of subcomponent 140c and remove the job ID from those records. In other embodiments, processor 108 can be configured to generate new transaction records indicating virtual movements of subcomponent 140c from the first job to either the next job or to a virtual "holding" location with no specific job association. In summary, the performance of method 900 allows for the association of job IDs with transaction records for which subcomponents are being engaged into production line 136 for conversion, while transaction records related to subcomponents not yet being used do not immediately receive job IDs.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A method of managing inventory, the method comprising:
- storing a plurality of job records in a memory, each job record comprising a different one of a plurality of job identifiers, one of a plurality of production line identifiers, and at least one of a plurality of subcomponent identifiers;
- receiving a transaction record comprising a first subcomponent identifier and a first production line identifier;
- determining whether the transaction record includes one of the job identifiers;
- when the determination is negative, selecting one of the job identifiers by locating one of the job records including one or both of a subcomponent identifier matching the first subcomponent identifier, and a production line identifier matching the first production line identifier, and selecting the job identifier of the located job record;
- storing the transaction record in the memory in association with the selected one of the plurality of job identifiers;
- receiving a reconciliation request comprising the selected job identifier and a count of at least one subcomponent;
- retrieving at least one transaction record stored in association with the selected job identifier;
- determining whether a discrepancy exists between the count and the at least one transaction record;
- when the determination of whether a discrepancy exists is affirmative, determining if the discrepancy falls within a predetermined configurable tolerance, defined as one of a fraction of a quantity of subcomponent and an absolute quantity of subcomponent; and
- when the discrepancy falls within the predetermined configurable tolerance, automatically generating at least one correcting entry.

2. The method of claim 1, further comprising:
- when the determination of whether a discrepancy exists is affirmative, transmitting a summary of the at least one transaction record via a communications interface; and
- receiving at least one correcting entry.

3. A server, comprising:
- a memory;
- a communications interface; and
- a processor interconnected with the memory and the communications interface, the processor configured to store a plurality of job records in the memory, each job record comprising a different one of a plurality of job identifiers, one of a plurality of production line identifiers, and at least one of a plurality of subcomponent identifiers;
- the processor further configured to receive a transaction record via the communications interface, the transaction record comprising a first subcomponent identifier and a first production line identifier
- the processor further configured to determine whether the transaction record includes one of the job identifiers;
- the processor further configured, when the determination is negative, to select one of the job identifiers by locating one of the job records including one or both of a subcomponent identifier matching the first subcomponent identifier, and a production line identifier matching the first production line identifier, and to select the job identifier of the located job record;
- the processor further configured to store the transaction record in the memory in association with one of the plurality of job identifiers;
- the processor further configured to receive a reconciliation request comprising the selected job identifier and a count of at least one subcomponent, and to retrieve at least one transaction record stored in association with the selected job identifier;
- the processor further configured to determine whether a discrepancy exists between the count and the at least one transaction record;
- the processor further configured, when the determination of whether a discrepancy exists is affirmative, to determine if the discrepancy falls within a predetermined configurable tolerance, defined as one of a fraction of a quantity of subcomponent and an absolute quantity of subcomponent; and
- the processor further configured, when the discrepancy falls within the predetermined configurable tolerance, to automatically generate at least one correcting entry.

4. The server of claim 3, the processor further configured to:
- when the determination of whether a discrepancy exists is affirmative, transmit a summary of the at least one transaction record via a communications interface; and
- receive at least one correcting entry.

5. A non-transitory computer-readable medium storing computer-readable instructions executable by a processor for implementing a method comprising:
- storing a plurality of job records in a memory, each job record comprising a different one of a plurality of job identifiers, one of a plurality of production line identifiers, and at least one of a plurality of subcomponent identifiers;
- receiving a transaction record comprising a first subcomponent identifier and a first production line identifier;
- determining whether the transaction record includes one of the job identifiers;
- when the determination is negative, selecting one of the job identifiers by locating one of the job records including one or both of a subcomponent identifier matching the first subcomponent identifier, and a production line identifier matching the first production line identifier, and selecting the job identifier of the located job record;
- storing the transaction record in the memory in association with the selected one of the plurality of job identifiers;
- receiving a reconciliation request comprising the selected job identifier and a count of at least one subcomponent;
- retrieving at least one transaction record stored in association with the selected job identifier;
- determining whether a discrepancy exists between the count and the at least one transaction record;
- when the determination of whether a discrepancy exists is affirmative, determining if the discrepancy falls within a predetermined configurable tolerance, defined as one of a fraction of a quantity of subcomponent and an absolute quantity of subcomponent; and
- when the discrepancy falls within the predetermined configurable tolerance, automatically generating at least one correcting entry.

* * * * *